Sept. 1, 1964 I. L. PHILLIPS 3,146,740
SOIL CHEMICAL DISTRIBUTING DEVICE
Filed Nov. 16, 1961
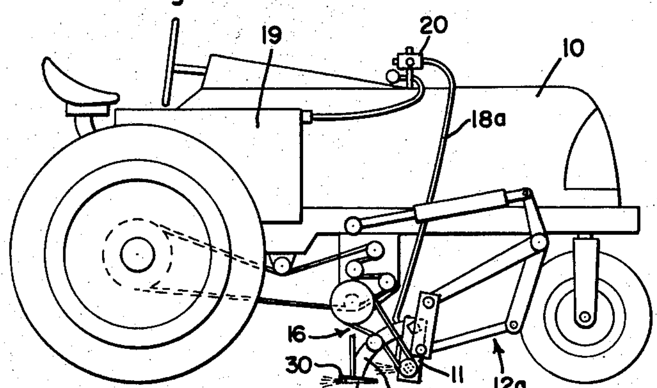
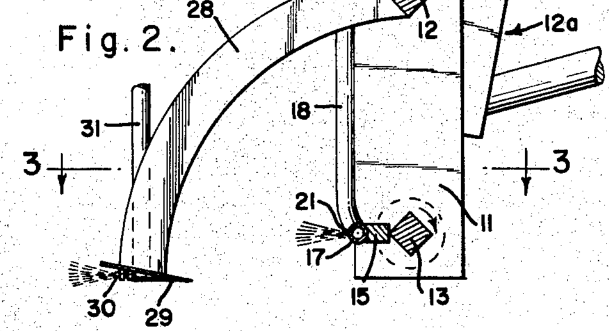
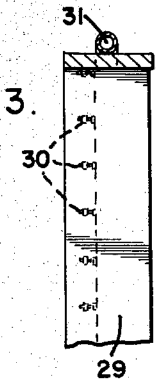
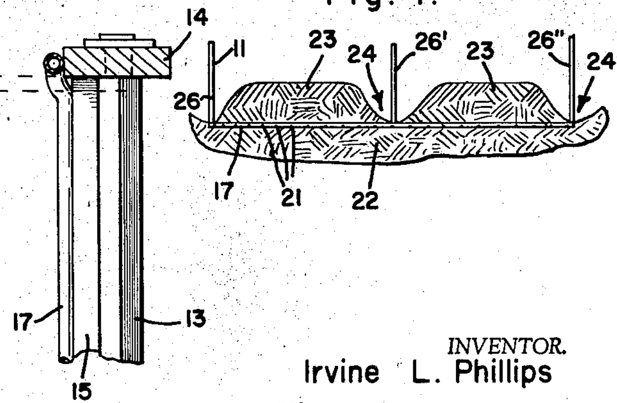
INVENTOR.
Irvine L. Phillips
BY
Townsend and Townsend
attorneys United States Patent Office 3,146,740

Patented Sept. 1, 1964

3,146,740

SOIL CHEMICAL DISTRIBUTING DEVICE

Irvine L. Phillips, King City, Calif., assignor, by mesne, assignments, to Union Carbide Corporation, a corporation of New York Filed Nov. 16, 1961, Ser. No. 152,773
4 Claims. (Cl. 111—7)

This invention relates to the dissemination of agricultural chemicals and the like in farm land. More particularly, it relates to a device and method for distributing soil treating chemicals uniformly in a predetermined stratum of an agricultural field.

In a preferred embodiment the gist of the invention lies in the use of a horizontal spray manifold juxtaposed substantially against the shear bar of a conventional "rod weeder." As the rod weeder's square rod rotates in cooperation with the shear bar and thereby disintegrates soil and matter contained therein such as weeds and normally occurring trash, the manifold follows directly behind and uniformly sprays out the soil treating chemical into the earth which has just been disintegrated.

The rod weeder and manifold combination are movable through a predetermined stratum of earth, surface or sub-surface. When the stratum being treated is subsurface, the operation does not significantly disrupt the structure of the soil surface.

Stated more specifically, the present invention provides a device for applying chemicals to soil for the treatment thereof comprising, in combination, a frame adapted to straddle the bed of a tilled field and means for supporting the frame and propelling it over the tilled field. At least one generally horizontal rotatable shaft having a square cross section is mounted on the frame for engagement with a predetermined sub-surface stratum in a bed of earth in the field. Means such as a tractor engine with suitable linkages are provided for rotating the shaft. There is a horizontal shear bar on the frame rearwardly of the shaft and spaced therefrom so that the square edges of the shaft substantially abut with the bar when the shaft is rotated to provide an earth disintegrating force.

A horizontal manifold is mounted on the frame bordering on the shear bar and substantially coextensive in length therewith. The manifold comprises a pipe having a plurality of spaced discharge holes facing away from the shear bar. Also provided is a chemical supply conduit in fluid communication with the manifold through which soil treating chemicals suitably under pressure may be supplied to the manifold.

The present invention is best appreciated by first considering prior methods and devices for placing and distributing soil treating chemicals such as fumigants, insecticides, nematocides, fungicides, herbicides, soil conditioners, plant growth regulators and plant nutritional materials in gas, liquid or solid forms in agricultural fields.

At an early date it was proposed to place the chemical in the earth by means of a horizontal knife urged to travel beneath the surface of the ground. The knife had a spray pipe attached at the back from which the chemical was discharged. Exemplary of this proposal is United States Patent 1,287,930 dated December 17, 1918.

While this type of device achieved a relatively uniform horizontal placement, it had the serious disadvantage of becoming readily snarled, entangled or otherwise fouled with sub-surface plant growth such as roots and the like and other types of trash which might be present in the soil. Both the soil and the other matter contained therein built up rapidly at the leading edge of the knife and progressed rearwardly and upwardly therefrom to such an extent that the surface of the soil above the stratum being treated was ultimately disrupted. The operation had to be discontinued periodically for cleaning of the knife blade and associated parts, causing the procedure to be unduly time-consuming.

More recently the following types of equipment have been used either separately or in combination for the dissemination of soil treating chemicals beside the type mentioned above. These newer methods include the use of vertical injection shanks, conventional discs, harrows, and various types of rototillers, and other surface soil mixing and stirring devices known to the art such as ordinary plows and lister shovels.

All of these types have major drawbacks in the dissemination of chemicals. For example, the weakness in the use of vertical injection shanks is the inability to properly seal the soil surface after its use. This permits the injected materials which are generally quite volatile to escape. Vertical shanks also cause a "slabbing" of the soil if moisture conditions are not optimum. Further, and perhaps even more significant, materials placed through vertical shanks reach a relatively narrow area, i.e. only areas adjacent to the points where the injection shanks engage the earth. Thorough horizontal coverage is virtually impossible.

The use of a disc causes a gross soil dilution of the material being disseminated thereby reducing its effectiveness. In addition, if the soils are not in proper tilth, the chemical may not be thoroughly incorporated.

Rototillers will operate satisfactorily only when the soil is in optimum condition. Harrows do not stir the earth to the proper depth and leave a large amount of the effected material exposed to the surface resulting in its loss. Soil of a trashy condition will not allow any of the equipment currently in use to do a satisfactory job for obvious reasons.

It is therefore a principal object of the present invention to provide a device and method for incorporating soil treating chemicals such as those noted above uniformly through a predetermined stratum of earth.

Another object is to provide a device and method for achieving a relatively thorough and uniform horizontal dispersion of the chemical through a predetermined stratum of earth.

Another important object is to provide a device and method for properly conditioning the soil for optimum chemical activity while uniformly placing the chemical therein.

A further object is to provide a method and means for avoiding the problem of trash in earth such as roots, weeds or stems that have heretofore made it extremely difficult to apply soil treating materials below the surface.

A feature of the present invention is in the rotating bar which loosens the soil before placement of the material. This leaves the soil loose and friable so that it is possible to place chemicals at the desired profile or depth and thereafter manipulate the soil so as to leave it in optimum condition for seeding and planting.

A further feature and advantage of the rotating bar of the present device is that it is not fouled by weeds, roots and the like and therefore does not plow or push through the soil and destroy the soil structure required for proper placement of the chemicals.

Another feature of the present invention is in the shear bar which follows directly behind the rotating bar when the device is in use and which cuts trash by a movement similar to that of a cutting bar of a lawn mower.

A further advantage of the present invention lies in the condition of the soil at the surface after being treated. The ground at the surface has not been disturbed and has been left in "seed bed condition." This is to be distinguished from the channels left by vertical shanks which may cause the soil to collapse when subsequently irrigated.

Another feature of the present invention lies in the undisturbed character of the soil surface after a sub-surface stratum has been treated in accordance with the present invention. The undisturbed character of the soil permits subsequent sealing to prevent the escape of the volatile materials which may have been employed.

Further objects, features and advantages will become apparent as the following detailed description proceeds when read in conjunction with the accompanying drawings in which:

FIG. 1 shows in schematic side elevation, a farm tractor incorporating the device provided by the present invention.

FIG. 2 shows in enlarged schematic side section the device provided by the present invention.

FIG. 3 shows in top section a segment of the device illustrated in FIG. 2, taken along the line 2—2 therein.

FIG. 4 shows in schematic end section a portion of a tilled field in which furrows and beds have been formed, and the position of the earth contacting portion of the present invention when being used therein.

Turning to the drawings, there is shown a conventional farm tractor 10. The present device is suitably depended from and powered by tractor 10. The present device includes a frame 11 depending from tractor 10 by tool bar 12 and suitable movable arms shown generally at 12*a*.

At the bottom of frame 11, a horizontal square bar or rod 13 is rotatably mounted at its two ends to frame 11 by means of suitable bearings and hubs, and shown generally in FIG. 3 for one end at 14. A similar configuration is present at the other end of rotating bar 13 but is not shown. Bar 13 is rotated from power supplied by tractor 10 through suitable belts or pulleys 16.

Mounted horizontally and in substantially abutting relation to rotating bar 13 is fixed shear bar 15.

A horizontal pipe manifold 17 is disposed immediately behind shear bar 15. A vertical extension conduit 18 links horizontal manifold pipe 17 with supply tank 19 on tractor 10 through line 18*a*. Suitable control valves 20 are inserted in line 18*a* between tank 19 and manifold pipe 17 to regulate the flow of chemicals therethrough. Manifold pipe 17 has a plurality of spaced discharged ports 21 facing rearwardly and away from shear bar 15 and rotating bar 13.

In use, as may best be seen in FIG. 4, the device of the present invention including frame 11 and associated parts described above, is lowered into a suitable position in a tilled field 22 having beds 23 and furrows 24. By propelling frame 11 over the field 22 with the frame 11 and associated parts at a given height, a stratum governed by the position of frame 11 will be acted upon in the following manner.

As rotating bar 13 turns in cooperation with shear bar 15, the soil and material contained therein, such as roots and the like, will be disintegrated. Manifold pipe 17 will be moved into the disintegrated earth as the rotating bar 13 and shear bar 15 leave. The desired soil treating chemicals are then suitably ejected from discharge ports 21 from manifold pipe 17.

It is to be noted that the discharge ports 21 are relatively closely spaced and thereby achieve substantially complete coverage of the earth being treated. By ejecting the chemical under pressure, an even more thorough and uniform dispersion of the chemical is obtained.

It is also to be noted that the vertical portions of frame 11 shown at 26, 26′, 26″ are suitably positioned to be moved through the furrow areas 24 so that the earth which is not undergoing rotation, shearing and treatment, remains virtually undisturbed.

As the device is passed through the selected stratum, the treated earth falls evenly back in place. The undisturbed earth thereabove serves to seal the treatment chemicals in the treated stratum. The upper portions of the beds 23 are in seed planting condition and are not channeled and cut such as the condition which prevails after the use of shank injectors.

In combination with the device described above, it is advantageous to employ a knife and spray pipe arrangement similar to that described in United States Patent 1,287,930 noted above. To accomplish this, an arcuate brace 28 is positioned outwardly and downwardly from frame 11. At the lower end of brace 28 knife 29 is mounted thereon.

A plurality of spray nozzles 30 are mounted at the rear or trailing edge of knife blade 29. Chemicals are supplied to spray nozzles 30 through tube 31 connected to a storage tank (not shown) on tractor 10. Flow of the chemicals to the nozzles 30 is suitably controlled by valves (not shown). Alternatively tube 31 may be connected to line 18*a* for spraying the same chemicals as ports 21.

Contrary to the problems previously encountered with the use of such a device, the present device permits the use of the knife 29 and nozzle 30 in combination with the rotating rod 13 and shear bar 15 described above. By mounting the knife blade 29 in a substantially common plane with the rotating bar 13 and shear bar 15, knife 29 will be permitted to pass freely through the soil without being fouled and entangled by trash and the like as before since the disintegrating action of the rotating bar 13 and shear bar 15 will have left the soil in suitable condition. In this manner the same or other soil treating chemicals may be horizontally injected into a predetermined strata simultaneously with the placement of chemicals from manifold pipe 17.

By this point it will have become apparent that the method of the preferred embodiment of the present invention provides for uniformly treating soil with chemicals by disintegrating a predetermined sub-surface stratum of soil along with matter contained therein by subjecting the soil to rotary movement and shearing action without significantly disrupting the structure of the surface of the soil; and disseminating a soil treating chemical in the disintegrated soil following the disintegration thereof by forcing the chemical under pressure into the soil at a closely spaced plurality of points without significantly disrupting the surface of the soil.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A device for applying chemicals to soil for the treatment thereof comprising, in combination:

(*a*) a frame adapted to be propelled over an agricultural field;

(*b*) disintegrating means mounted on said frame operable to disintegrate the soil along with the matter contained therein which lie in a predetermined stratum of earth while said frame is moved over the agricultural field;

(*c*) said disintegrating means comprising at least one generally horizontal rotatable shaft having a surface operable to loosen soil in a predetermined stratum during rotation thereof and a shearing bar adapted for cooperative cutting therewith mounted on said frame for movement along a predetermined sub-surface stratum in a bed of earth;

(*d*) means for rotating said shaft;

(*e*) and discharge means including a distributing manifold mounted on the frame adjacent to and behind said shearing bar, said manifold, shearing bar and rotatable shaft all lying in substantially the same horizontal plane.

2. A device for applying chemicals to soil for the treatment thereof comprising, in combination:

(*a*) a frame constructed to straddle the beds in a tilled agricultural field and adapted to be propelled over said field;

(*b*) soil disintegrating means comprising at least one generally horizontal rotatable shaft having an angular cross-section and shearing bar adapted for cooperative cutting therewith mounted on said frame for movement through a predetermined subsurface stratum in a bed of earth;

(*c*) means for rotating said shaft;

(*d*) and a horizontal manifold mounted on said frame adjacent to and behind said shaft, said manifold, shearing bar and rotatable shaft all lying in substantially the same horizontal plane.

(*e*) said manifold defining a plurality of spaced discharge ports for substantially uniformly distributing chemicals supplied to said manifold to the stratum previously engaged by said shaft and bar.

3. A device for applying chemicals to soil for the treatment thereof comprising, in combustion:

(*a*) a frame adapted to straddle the beds in a tilled agricultural field;

(*b*) means for supporting said frame for movement over a tilled field;

(*c*) soil disintegrating means comprising at least one generally horizontal rotatable shaft having an angular cross-section and shearing bar adapted for cooperative cutting therewith mounted on said frame for engagement with a predetermined subsurface stantially the same horizontal plane;

(*d*) means for rotating said shaft;

(*e*) and a horizontal manifold mounted on said frame adjacent to and behind said shaft and bar, said manifold, shaft, and bar lying in substantially the same horizontal plane;

(*f*) said manifold defining a plurality of spaced discharge ports for substantially uniformly distributing chemicals supplied to said manifold to the stratum previously engaged by said shaft and bar;

(*g*) a horizontal blade depending from said frame, a spray pipe attached at the back of said blade, and a conduit for supplying chemicals to said spray pipe.

4. A device for applying chemicals to soil for the treatment thereof comprising, in combination:

(*a*) a frame;

(*b*) means for supporting said frame for movement over a tilled field;

(*c*) soil disintegrating means comprising at least one generally horizontally rotatable shaft having a square cross section mounted on said frame for engagement with a predetermined subsurface stratum in a bed of earth;

(*d*) means for rotating said shaft;

(*e*) a horizontal shear bar of substantially the same length as said shaft mounted on said frame rearwardly of said shaft and spaced therefrom so that the square edges of said shaft substantially abut and cooperate with said bar when said shaft is rotated to distintegrate soil and contained materials in said sub-surface stratum;

(*f*) horizontal manifold mounted on said frame and disposed behind said bar in abutting and coextensive relationship therewith, said manifold having a vertical thickness less than the vertical thickness of said rotatable shaft and lying substantially in a common horizontal plane with said rotatable shaft and said bar;

(*g*) said manifold comprising a pipe having a plurality of spaced discharge holes facing away from said bar;

(*h*) and a chemical supply conduit in fluid communication with said manifold pipe.

References Cited in the file of this patent

UNITED STATES PATENTS

| | | |
|---|---|---|
| 747,118 | Barker | Dec. 15, 1903 |
| 1,204,772 | Hornecker | Nov. 14, 1916 |
| 2,322,256 | Rubens | June 22, 1943 |
| 2,628,546 | Kempling | Feb. 17, 1953 |
| 2,747,354 | Bloser | May 29, 1956 |
| 2,781,612 | Dugan | Feb. 19, 1957 |
| 2,827,005 | Calkins | Mar. 18, 1958 |
| 2,954,085 | Roberts | Sept. 27, 1960 |
| 3,033,135 | Govin | May 8, 1962 |